United States Patent
Shnaider et al.

(10) Patent No.: US 7,848,391 B2
(45) Date of Patent: Dec. 7, 2010

(54) INTERFERENCE CANCELLATION IN A SPREAD SPECTRUM RECEIVER

(75) Inventors: Mikhail Shnaider, Victoria (AU); Vasic Dobrica, Victoria (AU); Holly He, Victoria (AU); Filip Zalio, Victoria (AU)

(73) Assignee: NEC Corporation, Tokyo (JP)

( * ) Notice: Subject to any disclaimer, the term of this patent is extended or adjusted under 35 U.S.C. 154(b) by 664 days.

(21) Appl. No.: 11/815,719

(22) PCT Filed: Feb. 8, 2006

(86) PCT No.: PCT/JP2006/302593
§ 371 (c)(1),
(2), (4) Date: Aug. 7, 2007

(87) PCT Pub. No.: WO2006/085675
PCT Pub. Date: Aug. 17, 2006

(65) Prior Publication Data
US 2009/0028222 A1     Jan. 29, 2009

(30) Foreign Application Priority Data
Feb. 8, 2005   (AU)   ............................. 2005900565
Feb. 3, 2006   (AU)   ............................. 2006200464

(51) Int. Cl.
*H04B 1/00*   (2006.01)
(52) U.S. Cl. ...................................................... 375/148
(58) Field of Classification Search .................. 375/148
See application file for complete search history.

(56) References Cited

U.S. PATENT DOCUMENTS

| 5,553,062 | A  | * | 9/1996 | Schilling et al. | ............ 370/479 |
| 2003/0174686 | A1 |   | 9/2003 | Willenegger et al. | |
| 2004/0028013 | A1 | * | 2/2004 | Fitton et al. | .................. 370/335 |
| 2004/0156423 | A1 | * | 8/2004 | Li et al. | ....................... 375/148 |
| 2005/0213529 | A1 | * | 9/2005 | Chow et al. | .................. 370/320 |

FOREIGN PATENT DOCUMENTS

| EP | 1605601 | 12/2005 |
| GB | 2384662 | 7/2003 |
| WO | WO-2004/049112 | 6/2004 |

OTHER PUBLICATIONS

3rd Generation Partnership Project: Technical Specification Group Radio Access Network; Spreading and modulation (FDD) (Release ); 3GPP TS 25.213 v6.4.0, Sep. 2005.

* cited by examiner

*Primary Examiner*—Juan A Torres
(74) *Attorney, Agent, or Firm*—Dickstein Shapiro LLP

(57) ABSTRACT

A method of cancelling interference induced by a coherent interference source in a spread spectrum receiver comprising the steps of: quantifying (44; 94) first interference values induced by the coherent interference source (SCH) in symbols on a first spread spectrum physical channel (P-CCPCH; CPICH); calculating (46, 48, 50; 96, 98, 100) second interference values induced by the coherent interference source in symbols on a second spread spectrum channel (DPCH) from the first interference values; and applying (18; 74) a correction value, derived from the second interference values, to the symbols on the second spread spectrum channel.

11 Claims, 8 Drawing Sheets

INTERFERENCE CANCELLATION IN A SPREAD SPECTRUM RECEIVER

TECHNICAL FIELD

The present invention relates generally to wireless communication systems, and in particular to methods and devices for cancelling interference introduced by a coherent interference source in spread spectrum receivers.

BACKGROUND ART

In wireless communication systems, such as Wideband Code Divisional Multiple Access (W-CDMA) systems, various channels are multiplexed together and transmitted on a single frequency channel. In parallel, various other channels, such as a synchronization channel, are transmitted over a common air link. These channels may induce interference in each other under certain transmission conditions. For example, as the synchronization channel is not constrained to be orthogonal to the other physical channels, the synchronization channel may introduce coherent interference to the other channels.

DISCLOSURE OF INVENTION

It would be desirable to provide a method of reducing inter-channel interference in spread spectrum systems in a simple and effective manner.

It would also be desirable to provide a method and device for reducing inter-channel interference in spread spectrum systems that ameliorates or overcomes one or more problems of known interference reduction methods and devices.

One aspect of the invention provides a method of cancelling interference induced by a coherent interference source in a spread spectrum receiver, the method including the steps of:

quantifying first interference values induced by the coherent interference source in symbols on a first spread spectrum physical channel;

calculating second interference values induced by the coherent interference source in symbols on a second spread spectrum channel from the first interference values; and applying a correction value, derived from the second interference values, to the symbols on the second spread spectrum channel.

The method may include the steps of:

determining a first cross-correlation between the coherent interference source and symbols received on the first spread spectrum channel;

deriving a scaling factor from the first cross-correlation and an estimation of the symbol power from the first spread spectrum channel;

determining a second cross-correlation between the coherent interference source and symbols received on a second spread spectrum channel;

deriving scaled second cross-correlation by applying the scaling factor to the second cross-correlation; and applying the scaled cross-correlation to the symbols on the second spread spectrum channel.

The method may also include the step of:

storing scaled cross-correlation values in a buffer for application to subsequent symbols on the second spread spectrum channel when the power of the symbols on the first spread spectrum channel fails to exceed a predetermined threshold.

The method may also include the step of:

determining first cross-correlation values only once per radio link.

The method may also include the step of:

determining second cross-correlation values only once per radio link or upon changing of channelization code associated with the second spread spectrum receiver channel.

Advantageously, the spread spectrum receiver may be a W-CDMA receiver.

The coherent interference source may be symbols transmitted on a common control channel, such as a synchronization channel SCH in a W-CDMA system.

The second spread spectrum channel may be a downlink dedicated physical channel. In this case, the second spread spectrum channel may be a dedicated physical channel DPCH in a W-CDMA system.

The first spread spectrum channel may be a common control channel, such as a primary common control physical channel P-CCPCH in a W-CDMA system where the primary common control physical channel P-CCPCH does not transmit symbols during the transmission of symbols on the synchronization channel SCH.

In one or more embodiments, the estimation of symbol power from the first spread spectrum channel (for example, the P-CCPCH) may be determined from the symbols induced on the first spread spectrum physical channel that temporally overlap the symbol transmitted on the synchronization channel SCH.

The first spread spectrum channel may alternatively be a common pilot channel CPICH in a W-CDMA system where the common pilot channel CPICH transmits symbols during the transmission of symbols on the synchronization channel SCH.

In other embodiments, the estimation of symbol power from the first spread spectrum channel (for example, the CPICH) may be determined from one or more symbols on the first spread spectrum channel that are temporally adjacent to the symbol transmitted on the synchronization channel SCH.

Another aspect of the invention provides an interference signal processing module for cancelling interference induced by a coherent interference source in a spread spectrum receiver by applying a method described hereabove.

The following description refers in more detail to the various features of the present invention. To facilitate an understanding of the invention, reference is made in the description to the accompanying drawings where the method and device for cancellation of interference induced by a coherent interference source in a spread spectrum receiver is illustrated in a preferred embodiment. It is to be understood that the invention however is not limited to the preferred embodiment as illustrated in the drawings.

BEST MODE FOR CARRYING OUT THE INVENTION

A W-CDMA downlink includes one or more downlink dedicated physical channels, one shared and five common control channels: a Downlink Dedicated Physical Channel (DPCH), a Physical Downlink Shared Channel (DSCH), Primary and Secondary Common Pilot Channels (CPICH), Primary and Secondary Common Control Channels (CCPCH) and a Synchronization Channel (SCH). The DPCH contains control and data information. In order to synchronize a W-CDMA receiver, a base station transmits the CPICH with a predefined symbol sequence. The SCH is used for cell search, and consists of two sub channels, the primary and secondary synchronization channels. The SCH is non-orthogonal to the other channels and is only switched on during the first 256 chips or symbols of each slot. The Primary CCPCH (P-CCPCH) is a fixed rate downlink physical channel used to carry the Broadcast Channel (BCH). The P-CCPCH is not transmitted during the first 256 chips of each slot.

Figure 1:
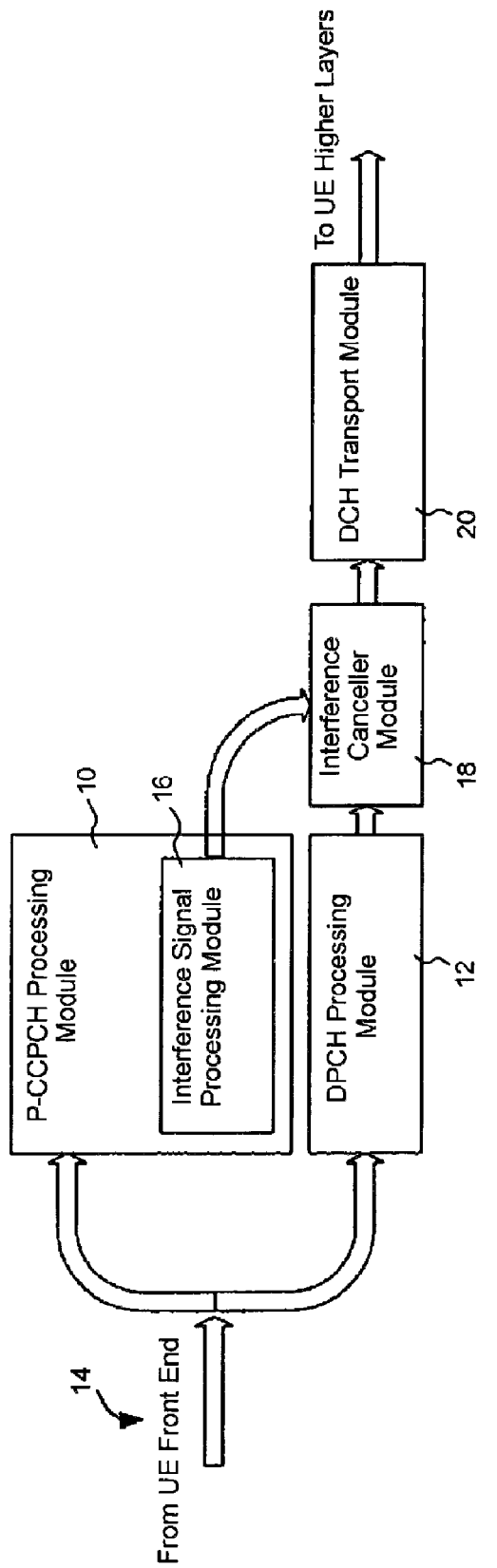
FIG. 1 is a schematic diagram of selected modules forming part of a first embodiment of W-CDMA receiver.

As can be seen in FIG. 1, a W-CDMA receiver includes a P-CCPCH processing module 10 and a DPCH processing module 12. Each of these modules receives inputs from a UE (user equipment) front end 14. The front end 14 typically includes analogue processing, sampling and conversion modules (not shown) to convert the analogue signal received by the UE to a digital signal. The P-CCPCH processing module 10 demodulates the digitized signal using a scrambling code and predefined channelization code. The DPCH processing module 12 demodulates the digitized signal using a scrambling code and chanelisation code for the corresponding DPCH channel.

In strong signal conditions, the SCH induced interference the other WCDMA downlink channels becomes significant. In order to enable cancellation of this interference in the DPCH channel, the P-CCPCH processing module 10 includes an interference signal processing module 16 that cooperates with an interference canceller module 18 interconnecting the DPCH processing module 12 to a DCH transport module 20.

Figure 2:
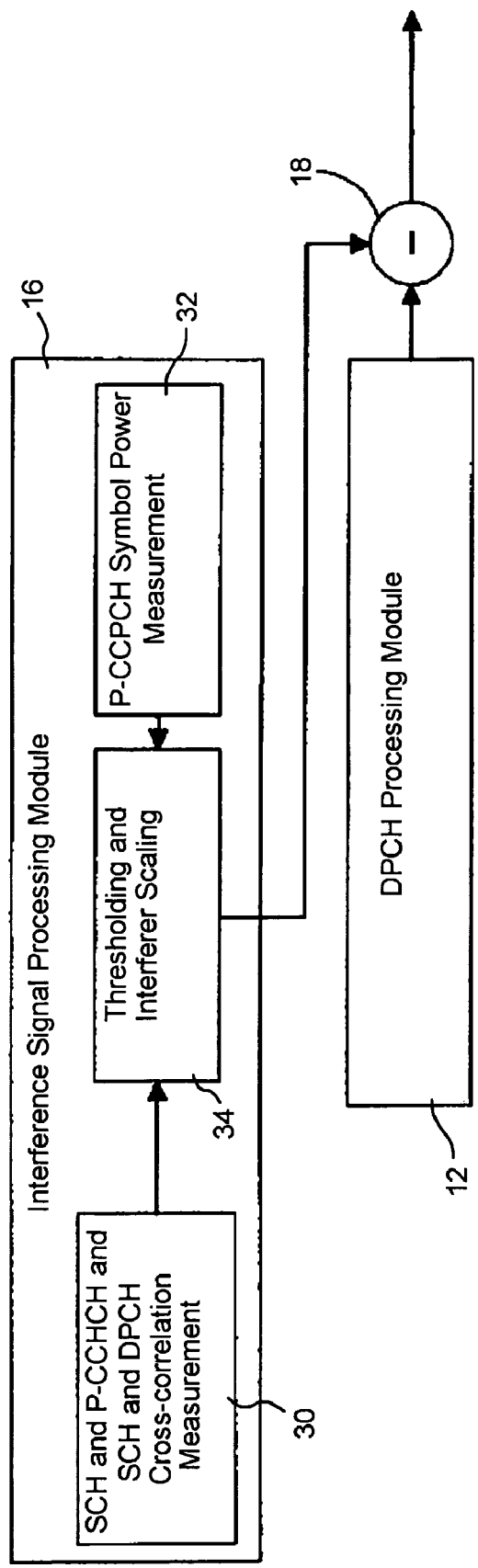
FIG. 2 is a schematic diagram showing a detailed view of one of the modules depicted in FIG. 1.

A more detailed view of the interference signal processing module 16 is depicted in schematic form in FIG. 2. As seen in this figure, the interference signal processing module 16 includes a cross-correlation module 30 for determining cross-correlation values between the P-CCPCH and the SCH, and also between the DPCH and the SCH. The symbol power measurement module 32 measures the power of the complex symbol or symbols detected in the P-CCPCH that temporally overlap the SCH transmission. As explained above, the P-CCPCH is not transmitted during the first 256 chips of each slot. Instead, the primary and secondary SCHs are transmitted during this period. Accordingly, the complex symbol or symbols in the P-CPCH that temporarily overlap the SCH transmission are caused by unwanted interference induced in the P-CCPCH by the SCH.

The architecture and operation of modules 30 and 32 are well known from conventional W-CDMA receiver design. The cross-correlation values determined by module 30 and the power measurement values from module 32 are input to thresholding and interferer scaling module 34 for use in determination of correction values to be applied to the symbols output by the DPCH processing module 12 by the interference canceller module 18.

Figure 3:
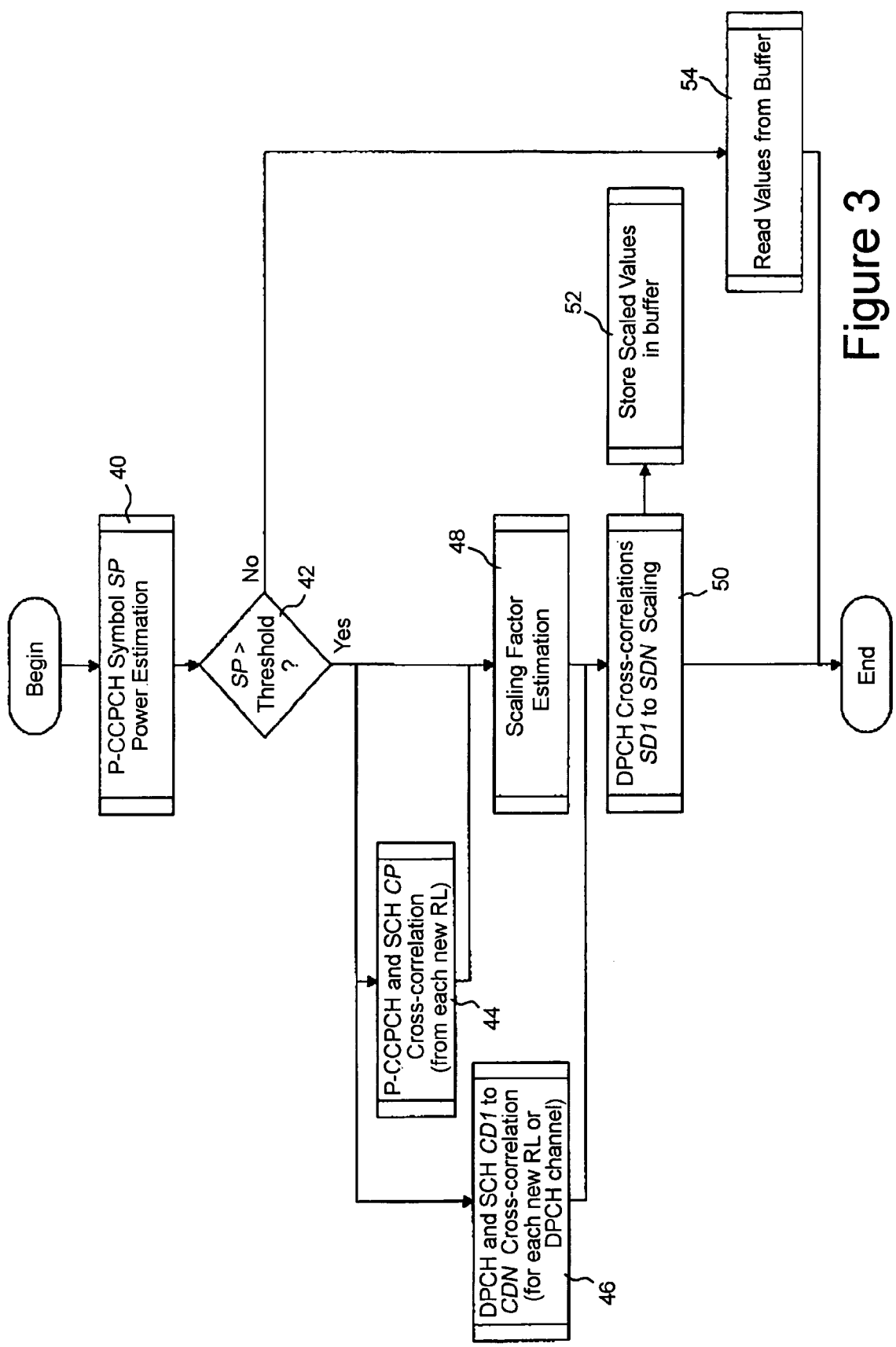
FIG. 3 is a flow chart illustrating the steps performed by the module depicted in FIG. 2.

The operation of the interference signal processing module 16 will now be described with reference to FIG. 3. At step 40, the P-CCPCH power measurement module 32 computes an estimate of the power of quadrature I and Q P-CCPCH symbols demodulated from the UE front end 14 by the P-CCPCH processing module 10. Only the first symbol for each slot in a P-CCPCH frame is used for processing. The power estimate of each symbol SP is calculated according to $SP=I^2+Q^2$.

At step 42, the thresholding and interferer scaling module 34 determines whether the measured symbol power is above a predetermined threshold. If this is the case, the cross-correlation measurement module 30 acts at step 44 to calculate the cross-correlation between the scrambling code multiplied by the channelization code "1" as defined by 3GPP 25.213 and the SCH pattern transmitted. The cross-correlation is calculated per quadrature I and Q components per slot with 15 quadrature I and Q cross-correlations being calculated per radio frame. This calculation is only performed once per radio link.

The resultant cross-correlation values CP[1] to CP[15] representative of the cross-correlation between the P-CCPCH and the SCH transmitted pattern, during SCH transmission, of the quadrature I and Q symbols are calculated and stored in a frame buffer until the radio link is released.

At step 46, for each DPCH channel received by the UE, the cross-correlation measurement module 30 also calculates the quadrature I and Q components of cross-correlation values CD1 to CDN, between the scrambling code multiplied by the channelization code for the corresponding DPCH and SCH pattern transmitted for each slot. The number of cross-correlation values N for every slot in a radio frame depends on the spreading factor of the DPCH, with N being calculated as N=256/DPCH_SF where DPCH_SF is the spreading factor of the DPCH. The cross-correlation values calculated in step 46 by the cross-correlation module 30 are calculated per slot with 15*N cross-correlations per radio frame per DPCH. The output of the cross-correlation measurement module 30 from step 46 becomes CD[I, J] where/has a value from 1 to 15 (corresponding to the 1 to 15 slots) and J has a value from 1 to N (corresponding to the number of cross-correlations for every slot). These values are stored in the frame buffer until the radio link is released or until the DPCH channelization code is changed. In such a case, these values are recalculated by the cross-correlation measurement module 30.

At step 48, the thresholding and interferer scaling module 34 acts to calculate a scaling factor for a current slot/from the stored P-CCPCH/SCH cross-correlation values CP[I] calculated in step 44, and from the current symbol power SP calculated in step 40, where the scaling factor F is given by F=sqrt(SP/CP[I]). The scaling factor F is only calculated once per slot.

At step 50, the thresholding and interferer scaling module 34 takes two inputs per slot, namely the scaling factor F determined at step 48, and the stored DPCH/SCH cross-correlation values CD[I, 1] to CD[I, N] determined from step 46 for the current slot I. Each component of each cross-correlation is scaled with the scaling factor F to calculate scaled cross-correlation values SD according to the following:

$$SD1\_I = F*CD\_I[I,1]$$

$$SD1\_Q = F*CD\_Q[I,1]$$

$$SDN\_I = F*CD\_I[I,N]$$

$$SDN\_Q = F*CD\_Q[I,N]$$

The values of SD1 to SDN in the form of quadrature I and Q components are output by the thresholding and interferer scaling module 34 to the interference canceller module 18. The rate of output is N symbols of quadrature I and Q components per slot.

The scaled cross-correlation values calculated in step 50 are also stored in the frame buffer at step 52. These values are subsequently read from the frame buffer at step 54 during a subsequent frame in cases where the estimated symbol power SP is determined at step 42 to be below the above mentioned predetermined threshold.

Figure 4:
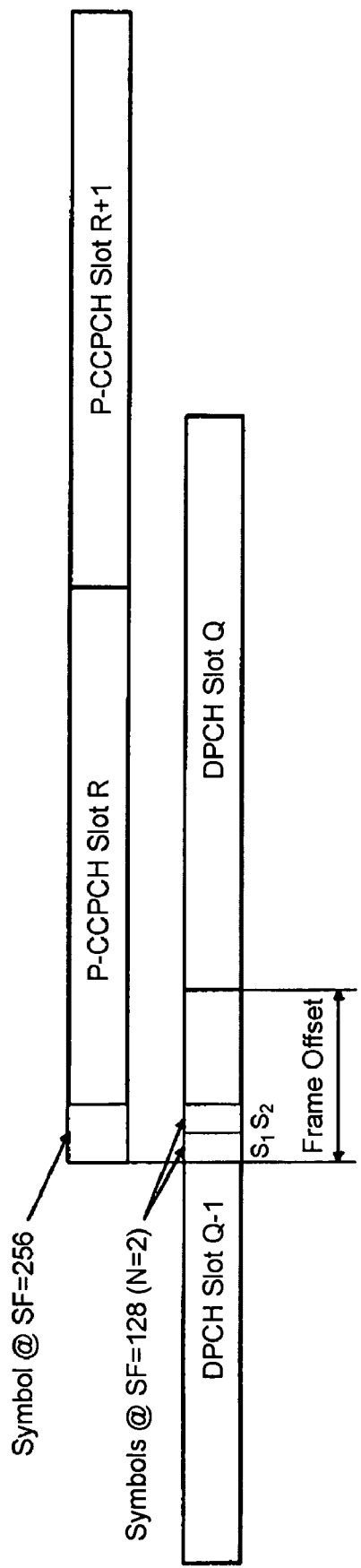
FIG. 4 is a timing diagram showing the relative slot and symbol timings in two channels received and processed by the modules depicted in FIGS. 1 and 2.

The scaled cross-correlation values calculated in step 50 are then applied to the DPCH symbols in the temporarily slot overlapping with the SCH transmission to cancel the interference induced by the SCH. The interference canceller module 18 uses three inputs, namely the DPCH symbols from the slot overlapping with the SCH transmission, the scaled cross-correlation values calculated at step 50, and a Frame Offset FO which is a timing parameter available from higher layers of the W-CDMA receiver. In this example, the frame offset FO is specified as a multiple of 256 system chips. An example of the timing between the P-CCPCH and the DPCH, showing the frame offset between slots in each of these two channels is shown in FIG. 4.

The DPCH symbols SI to SN which temporarily overlap with the first symbol of the P-CCPCH (corresponding to the SCH transmission) are processed by the interference canceller module 18 according to the following:

$$S1\_I = S1\_1 - SD\_I$$

$$S1\_Q = S1\_Q - SD\_Q$$

$$SN\_I = S1\_1 - SDN\_I$$

$$SN\_Q = S1\_Q - SDN\_Q$$

All remaining DPCH symbols pass through the interference canceller module 18 unchanged.

It will be appreciated from the foregoing that the cancellation of interference induced by the SCH in the P-CCPCH does not require additional circuitry for interference measurement. The interference measurement is conducted using circuitry that already forms part of a conventional P-CCPCH demodulator. An important feature of the above described interference cancellation is the effective transference of an interference signal from one spread spectrum receiver channel (in this case the P-CCPCH in a W-CDMA downlink) to another (in this case the DPCH in the same W-CDMA receiver).

Figure 5:
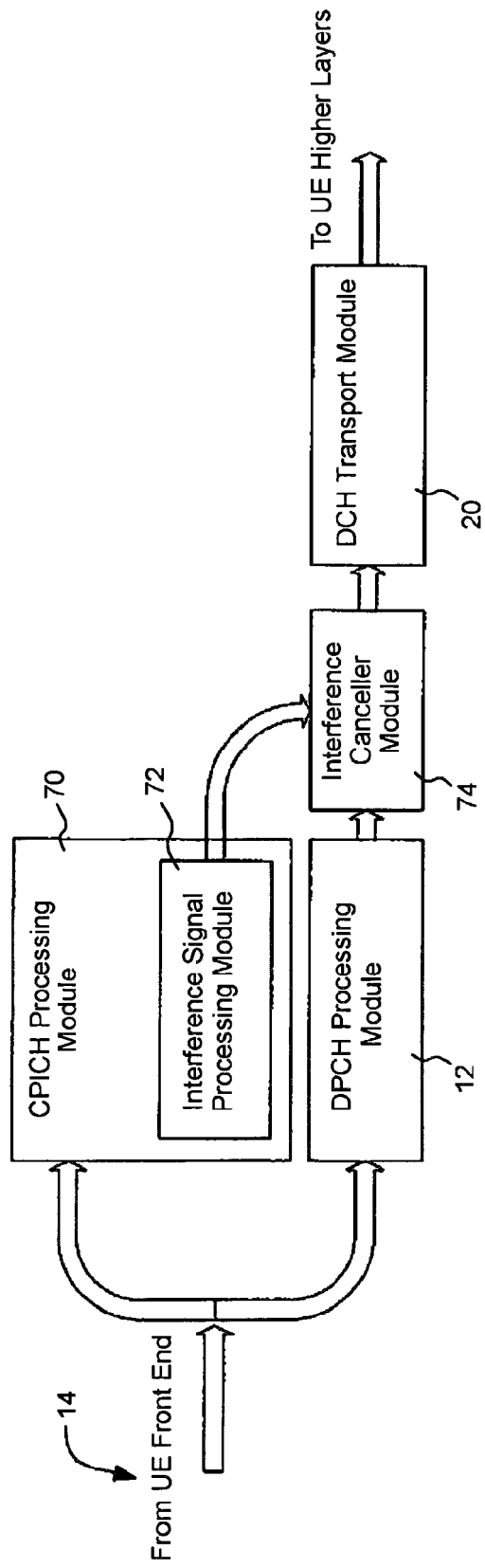
FIG. 5 is a schematic diagram of selected modules forming part of a second embodiment of W-CDMA receiver.

An alternate embodiment to that shown in FIGS. 1 to 4 is depicted in FIGS. 5 to 8. FIG. 5 shows a CPICH processing module 70 that also forms part of a W-CDMA receiver. Like the P-CCPCH processing module 10, the CPICH processing module receives inputs from a UE front end 14. The CPICH processing module 70 demodulates the digitized signal from the UE front end 14 using a scrambling code and channelization code. As explained previously, the DPCH processing module 12 demodulates the digitized signal using a scrambling code and chanelisation code for the corresponding DPCH channel. In order to enable cancellation of this the SCH induced interference in the DPCH channel, the CPICH processing module 70 includes an interference signal processing 72 that cooperates with an interference canceller module 74 interconnecting the DPCH processing module 12 to a DCH transport module 20.

Figure 6:
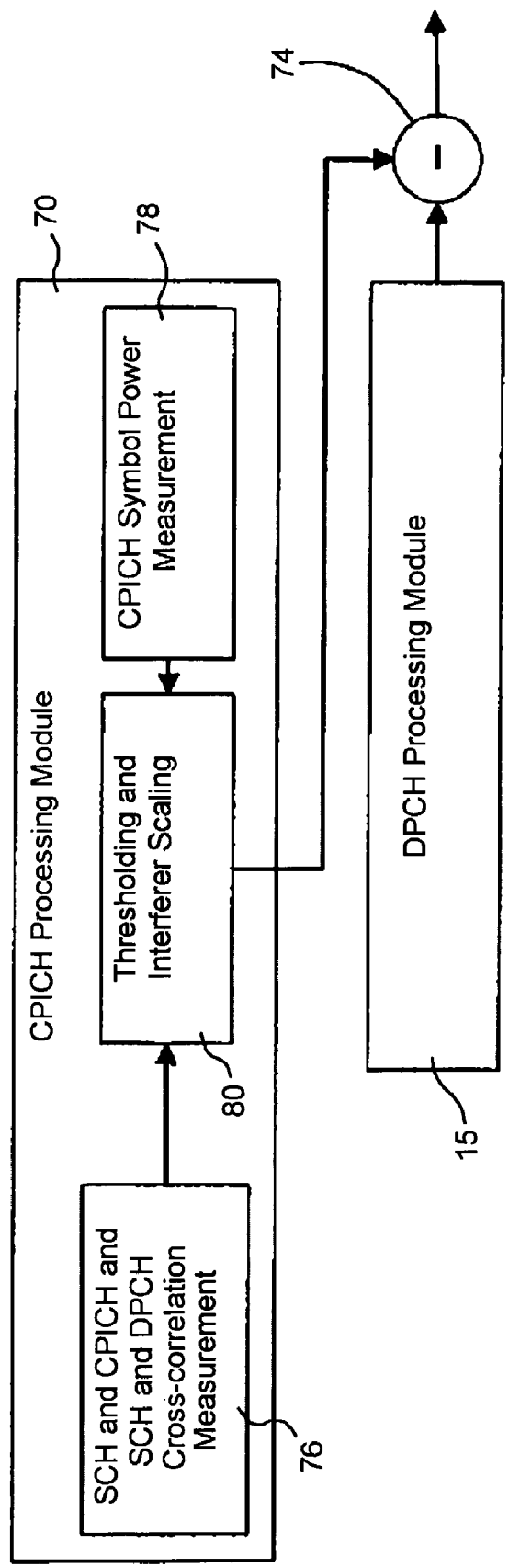
FIG. 6 is a schematic diagram showing a detailed view of one of the modules depicted in FIG. 5.

A more detailed view of the interference signal processing module 70 is depicted in schematic form in FIG. 6. As seen in this figure, the interference signal processing module 70 includes a cross-correlation module 76 for determining cross-correlation values between the CPICH and the SCH, and also between the DPCH and the SCH. The symbol power measurement module 78 measures the power of the complex symbols detected in the CPICH that are temporally adjacent the SCH transmission. Unlike the P-CCPCH, transmission of the CPICH is not interrupted whilst the primary and secondary SCHs are transmitted.

The architecture and operation of modules 76 and 78 are well known from conventional W-CDMA receiver design. The cross-correlation values determined by module 76 and the power measurement values from module 78 are input to a thresholding and interferer scaling module 80 for use in determination of correction values to be applied to the symbols output by the DPCH processing module 12 by the interference canceller module 74.

Figure 7:
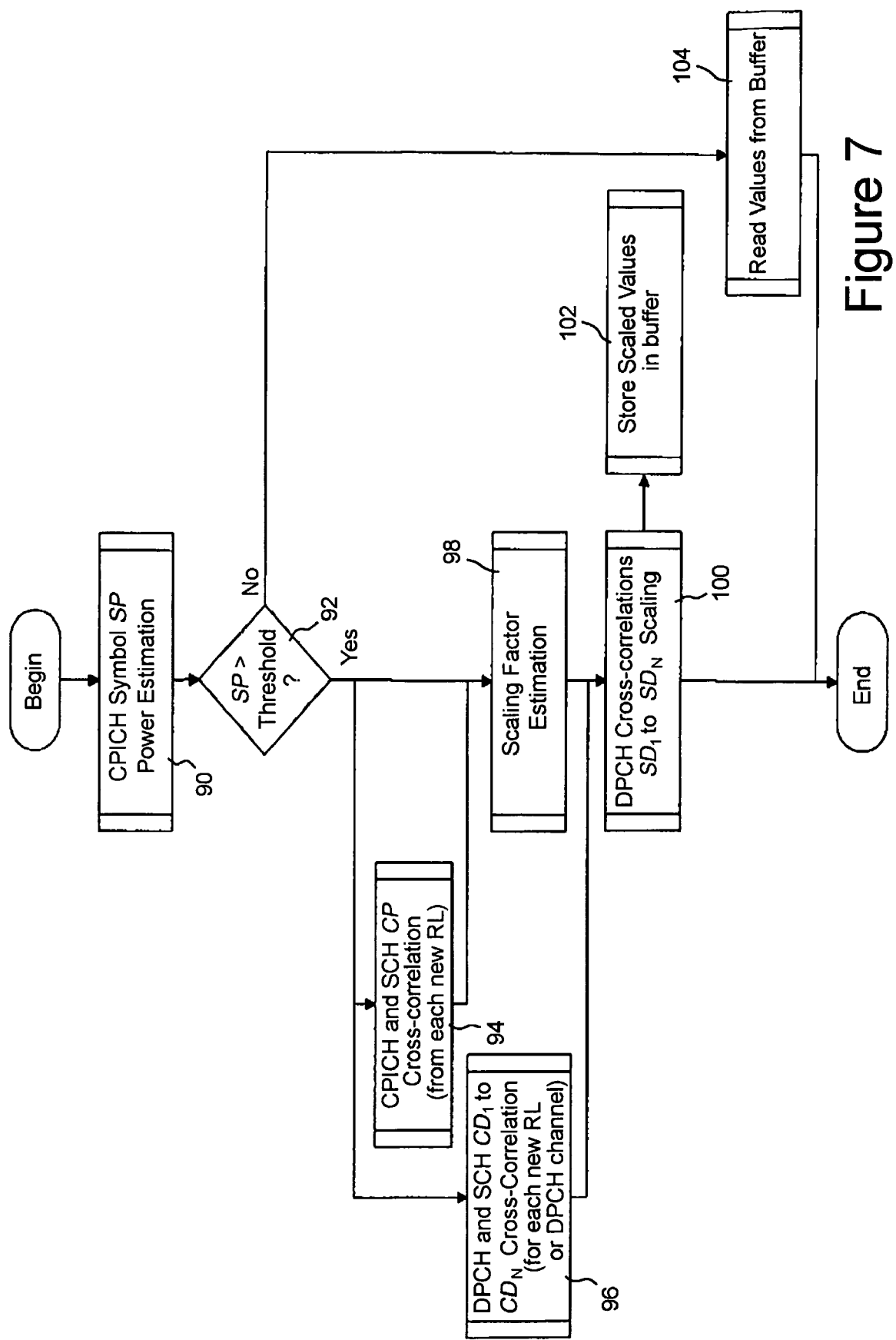
FIG. 7 is a flow chart illustrating the steps performed by the modules depicted in FIG. 6.
Figure 8:
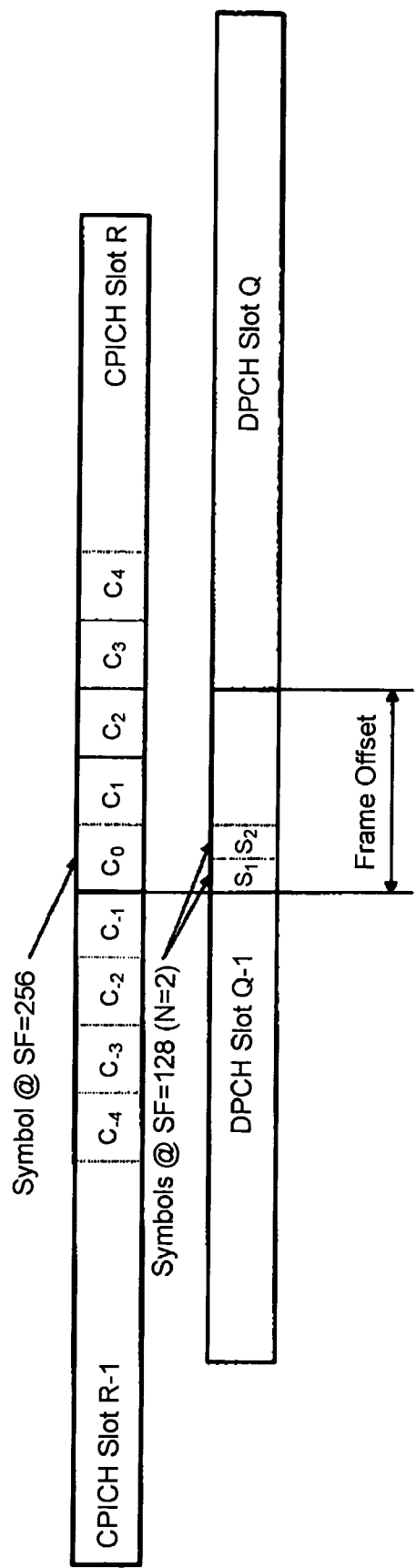
FIG. 8 is a timing diagram showing the relative slot and symbol timings in two channels received and processed by the modules depicted in FIGS. 5 and 6.

The operation of the interference signal processing module 72 will now be described with reference to FIG. 7. At step 90, the CPICH symbol power measurement module 78 computes an estimate of the power of quadrature I and Q CPICH symbols demodulated from the UE front end 14 by the CPICH processing module 70. The average amplitudes of I and Q components of CPICH symbols are respectively calculated as:

$$C_{Ave}^{I} = \frac{1}{8} \sum_{K=-4(k \ne 0)}^{4} C_{k}^{I}$$

and $$C_{Ave}^{Q} = \frac{1}{8} \sum_{K=-4(k \ne 0)}^{4} C_{k}^{Q}$$

where k has a value from −4 to 4 (as shown in FIG. 8). In other embodiments, the possible values of k may vary. It will be noted that the "zero-position" symbol temporally overlapping the transmission of symbols on the SCH is not used in this calculation, but instead the symbols temporally adjacent the transmission of symbols on the SCH are used.

The average power of the measured CPICH symbols $P_{Ave}$ is calculated by the CPICH symbol power measurement module 78 as:

$$P_{Ave} = (C_{Ave}^{I})^{2} + (C_{Ave}^{Q})^{2}$$

The output power SP of the CPICH symbol that temporally overlaps with the SCH transmission is then calculated as follows:

$$SP_{0} = P_{0} - P_{Ave}$$

If the measured power $SP_0$ is above the threshold (92) the processing continues to (10) otherwise a set of values computed from the previous frame are read from the buffer (12) and used for cancellation.

If this is the case, the cross-correlation module 76 acts at step 94 to calculate the cross-correlation between the scrambling code multiplied by the CPICH channelization code "0" as defined by 3GPP 25.213 and the SCH pattern transmitter. A cross-correlation is calculated per I and Q components per slot with 15 I and Q components per slot with 15 I and Q cross-correlations per radio frame. This calculation is performed only once per radio link. The resultant cross-correlation values CP[1] to CP[15] of the I and Q symbol components are calculated and stored in the frame buffer until the radio link is released.

At step 96, and for each DPCH channel received by the UE, the cross-correlation measurement module 76 also calculates the quadrature I and Q components of cross-correlation values $CD_1$ to $CD_n$ between the scrambling code multiplied by the channelization code for the corresponding DPC and SCH pattern transmitted for each slot. The number of cross-correlation values N for every slot in a radio frame depends on the spreading factor DPCH with N calculated as N=256/DPCH_SF where DPCH_SF is the spreading factor of DPCH. The cross-correlation values are calculated per slot with 15*N cross-correlations per radio frame per DPCH. The output of the cross-correlation measurement module 30 from step 96 becomes $CD_j[i]$ where i has a value from 1 to 15 (corresponding to the 1 to 15 slots) and j has a value from 1 to N (corresponding to the number of cross-correlations for every slot). These values are stored in the frame buffer until the radio link is released or the DPCH channelization code is changed. In such cases, these values are recalculated by the cross-correlation measurement module 76.

At step 98, the threshold and interference scaling module 80 acts to calculate a scaling factor estimation for a current slot i from the stored CPICH/SCH cross-correlation values CP[i] calculated in step 94, and from the current power $SP_0$ calculated in step 96, where the scaling factor F is given by $F_0=\sqrt{SP_0/CP[i]}$. The scaling factor F is calculated only once per slot.

At step 100, the threshold and interferer scaling module 80 takes two inputs per slot, namely the scaling factor F determined at step 98 and the stored DPCH/SCH cross-correlation values $CD_1[i]$ to $CD_N[i]$ determined from step 96 for the current slot i. Each component of each cross-correlation is scaled with the scaling factor F to calculate scaled cross-correlation values SD according to the following:

$$SD_{1\_0}^I = F_0 CD_1^I[i]$$

$$SD_{1\_0}^Q = F_0 CD_1^Q[i]$$

...

$$SD_{N\_0}^I = F_0 CD_N^I[i]$$

$$SD_{N\_0}^Q = F_0 CD_N^Q[i]$$

The values $SD_{1\_0}$ to $SD_{N\_0}$ in the form of quadrature I and Q components are output by the thresholding and interferer scaling module 80 to the interference canceller module 74. The rate of output is N symbols of quadrature I and Q components per slot. The scaled cross-correlation values calculated in step 100 are also stored in a frame buffer in step 102. These values are subsequently read from the frame buffer at step 104 in cases where the estimated symbol power $SF_0$ is determined at step 92 to be below the above mentioned predetermined threshold.

The scaled cross-correlation values calculated in step 100 are then applied to the DPCH symbols in the slot temporarily over-lapping with the SCH transmission to cancel the interference induced by the SCH in that slot. The interference canceller module 74 uses three inputs, namely the DPCH symbols from this slot over-lapping with the SCH transmission, the scaled cross-correlation values calculated at step 100, and a frame off-set FO which is a timing parameter available from the highest layers of the W-CDMA receiver. An example of the timing between the CPICH and the DPC, showing the frame offsets between slots in each of these two channels is shown in FIG. 8.

DPCH $S_{1\_0}$ to $S_{N\_0}$ symbols which overlap in time with the first symbol of the current CPICH slot are processed by the interference canceller module 74 as follows:

$$S_{1\_0}^I = S_{1\_0}^I - SD_{1\_0}^I$$

$$S_{1\_0}^Q = S_{1\_0}^Q - SD_{1\_0}^Q$$

...

$$S_{N\_0}^I = S_{N\_0}^I - SD_{N\_0}^I$$

$$S_{N\_0}^Q = S_{N\_0}^Q - SD_{N\_0}^Q$$

In the above described scheme, similar processing steps can be applied to symbols adjacent to the symbol temporarily overlapping with the SCH symbol transmission (referenced $C_0$ in FIG. 8). For example, candidates to which these processing steps may apply are those symbols reference $C_{-1}$ and $C_1$ in FIG. 8.

Those skilled in the art will appreciate that there may be many variations and modifications of the above described method and device for measurement and cancellation of induced interference described herein which are within the scope of the present invention.

The invention claimed is:

1. A method of cancelling interference induced by a coherent interference source in a spread spectrum receiver, the method comprising the steps of:
   quantifying first interference values induced by the coherent interference source in symbols on a first spread spectrum physical channel;
   calculating second interference values induced by the coherent interference source in symbols on a second spread spectrum channel from the first interference values;
   applying a correction value, derived from the second interference values, to the symbols on the second spread spectrum channel;
   determining a first cross-correlation between the coherent interference source and symbols received on the first spread spectrum channel;
   deriving a scaling factor from the first cross-correlation and an estimation of the symbol power from the first spread spectrum channel;
   determining a second cross-correlation between the coherent interference source and symbols received on a second spread spectrum channel;
   deriving scaled second cross-correlation by applying the scaling factor to the second cross-correlation;
   applying the scaled cross-correlation to the symbols on the second spread spectrum channel; and
   storing scaled cross-correlation values in a buffer for application to subsequent symbols on the second spread spectrum channel when the power of the symbols on the first spread spectrum channel fails to exceed a predetermined threshold.

2. A method according to claim 1, further comprising the step of:
   determining first cross-correlation values only once per radio link.

3. A method according to claim 1, further comprising the step of:
   determining second cross-correlation values only once per radio link or upon changing of channelization code associated with the second spread spectrum receiver channel.

4. A method according to claim 1, wherein the spread spectrum receiver is a W-CDMA receiver.

5. A method according to claim 1, wherein the coherent interference source is symbols transmitted on a synchronization channel SCH in a W-CDMA system.

6. A method according to claim 1, wherein the second spread spectrum channel is a dedicated physical channel DPCH in a W-CDMA system.

7. A method according to claim 1, wherein the first spread spectrum channel is a primary common control physical channel P-CCPCH in a W-CDMA system where the primary common control physical channel P-CCPCH does not transmit symbols during the transmission of symbols on the synchronization channel SCH.

8. A method according to claim 7, wherein estimation of symbol power from the first spread spectrum channel is determined from the symbols induced on the first spread spectrum physical channel that temporally overlap the symbol transmitted on the synchronization channel SCH.

9. A method according to claim 1, wherein the first spread spectrum channel is a common pilot channel CPICH in a W-CDMA system where the common pilot channel CPICH transmits symbols during the transmission of symbols on the synchronization channel SCH.

10. A method according to claim 9, wherein the estimation of symbol power from the first spread spectrum channel is determined from one or more symbols on the first spread spectrum channel that are temporally adjacent to the symbol transmitted on the synchronization channel SCH.

11. A spread spectrum receiver comprising:
an interference signal processing module configured to cancel interference induced by a coherent interference source by:
quantifying first interference values induced by the coherent interference source in symbols on a first spread spectrum physical channel;
calculating second interference values induced by the coherent interference source in symbols on a second spread spectrum channel from the first interference values;
applying a correction value, derived from the second interference values, to the symbols on the second spread spectrum channel;
determining a first cross-correlation between the coherent interference source and symbols received on the first spread spectrum channel;
deriving a scaling factor from the first cross-correlation and an estimation of the symbol power from the first spread spectrum channel;
determining a second cross-correlation between the coherent interference source and symbols received on a second spread spectrum channel;
deriving scaled second cross-correlation by applying the scaling factor to the second cross-correlation;
applying the scaled cross-correlation to the symbols on the second spread spectrum channel; and
storing scaled cross-correlation values in a buffer for application to subsequent symbols on the second spread spectrum channel when the power of the symbols on the first spread spectrum channel fails to exceed a predetermined threshold; and an interference canceller module in communication with the interference signal processing module.

* * * * *